United States Patent
Garcia et al.

(10) Patent No.: US 9,968,119 B2
(45) Date of Patent: May 15, 2018

(54) COMPOSITION AND METHOD FOR PREPARING FROZEN GELATIN DESSERT

(75) Inventors: Claudia Moreno Garcia, Mexico CD (MX); Ignacio Lucas Maya, Mexico (MX)

(73) Assignee: Rich Products Corporatio, Buffalo, NY (US)

( * ) Notice: Subject to any disclaimer, the term of this patent is extended or adjusted under 35 U.S.C. 154(b) by 654 days.

(21) Appl. No.: 13/806,328

(22) PCT Filed: Jun. 30, 2011

(86) PCT No.: PCT/US2011/042569
§ 371 (c)(1),
(2), (4) Date: Feb. 15, 2013

(87) PCT Pub. No.: WO2012/003302
PCT Pub. Date: Jan. 5, 2012

(65) Prior Publication Data
US 2013/0142934 A1    Jun. 6, 2013

Related U.S. Application Data

(60) Provisional application No. 61/359,896, filed on Jun. 30, 2010.

(51) Int. Cl.
| | |
|---|---|
| A23L 1/0562 | (2006.01) |
| A23L 29/281 | (2016.01) |
| A23L 21/10 | (2016.01) |
| A23L 33/21 | (2016.01) |
| A23L 33/22 | (2016.01) |

(52) U.S. Cl.
CPC ........... *A23L 1/05625* (2013.01); *A23L 21/10* (2016.08); *A23L 29/284* (2016.08); *A23L 33/21* (2016.08); *A23L 33/22* (2016.08); *A23V 2002/00* (2013.01)

(58) Field of Classification Search
None
See application file for complete search history.

(56) References Cited

U.S. PATENT DOCUMENTS

| | | | | |
|---|---|---|---|---|
| 4,297,379 | A * | 10/1981 | Topalian | A23G 9/46 426/565 |
| 4,400,406 | A | 8/1983 | Morley | |
| 5,084,295 | A * | 1/1992 | Whelan et al. | 426/565 |
| 6,149,962 | A * | 11/2000 | Loh | A23L 1/0528 426/573 |
| 6,830,770 | B1 | 12/2004 | Kilibwa | |
| 2003/0108594 | A1 | 6/2003 | Manning et al. | |
| 2004/0091597 | A1 | 8/2004 | Ghaffari | |
| 2005/0222406 | A1 | 10/2005 | Alireza et al. | |
| 2009/0087513 | A1 | 4/2009 | Satz et al. | |
| 2010/0159088 | A1 * | 6/2010 | Leshik | A21D 2/188 426/250 |
| 2010/0196532 | A1 * | 8/2010 | Aymard | A23L 1/053 426/2 |

FOREIGN PATENT DOCUMENTS

| | | |
|---|---|---|
| EP | 1929873 | 6/2008 |
| EP | 2198722 | 6/2010 |
| WO | 2009003931 | 1/2009 |

OTHER PUBLICATIONS

Y.H. Hui, Bakery Products: Science and Technology, Feb. 28, 2008, Blackwell Publishing Ltd, First Edition 2006, 198-199.*
European Searching Authority, Extended European Search Report in corresponding application EP 11801402.5 (Jun. 16, 2017).

* cited by examiner

*Primary Examiner* — Nikki H. Dees
*Assistant Examiner* — Amber M Cox
(74) *Attorney, Agent, or Firm* — Fay Sharpe LLP

(57) ABSTRACT

Provided is a gelatin dessert which can be frozen and stored in the freezer for at least 6 months. Upon thawing, the gelatin dessert is a ready to use dessert that has desirable mouthfeel and organoleptic properties. The dessert comprises gelatine, sugar, inulin, wheat fiber, acacia gum, emulsifier, starch and water.

44 Claims, No Drawings

COMPOSITION AND METHOD FOR PREPARING FROZEN GELATIN DESSERT

CROSS REFERENCE TO RELATED APPLICATIONS

This application claims priority to Serial No. PCT/US2011/042569 filed Jun. 30, 2011, which in turn claims priority on U.S. Provisional Application No. 61/359,896, filed on Jun. 30, 2010, the disclosure of which is incorporated herein by reference.

FIELD OF THE INVENTION

The present invention relates generally to gelatin desserts and more particularly provides methods and compositions relating to freezer-stable gelatin desserts which are ready to use for consumption upon thawing.

BACKGROUND OF THE INVENTION

Gelatin is a product with a very short shelf life because grenetine gel is sensitive to being frozen. This product has very high water content, with an unstable protein gel. Such a product is very popular as a dessert or a side dish, particularly with children.

Currently, the product is mostly home-made and when it is produced on an industrial scale, it is generally presented in single use plastic cups of a single flavor. The product is stored in the refrigerator and distributed by the regular dairy refrigeration network.

SUMMARY OF THE INVENTION

The present invention provides ready to use gelatin compositions which are freezer stable for several weeks or months. The gel of the present composition comprises gelatin, fat, sugar, emulsifiers, stabilizers, starch, soluble fiber, wheat fiber and water. This composition has desirable organoleptic properties and has the characteristics of freezer stability with a shelf life of several months.

DETAILED DESCRIPTION OF THE INVENTION

The invention provides freezer-stable compositions for ready-to-use gelatin gel product. In contrast to other available products, this product is stable at freezer temperatures for several months. The gel of the present composition comprises gelatin, fiber and gel-stabilizing agents such as hydrocolloids. While not intending to be bound by any particular theory, it is considered that the hydrocolloids reinforce the protein network. The present composition has desirable organoleptic properties and has the characteristics of freezer stability with a shelf life of several months.

The gelatine dessert of the present invention comprises gelatin, fat, sugar, emulsifier, stabilizer, starch, soluble fiber (such as 1.5-3.5%), wheat fiber (such as 0.01 to 0.5%) and water. In one embodiment, the wheat fiber is 0.05 to 0.5%. All percentages are weight percentages unless indicated otherwise. Whenever a range of values is indicated in this application, all values to the tenth decimal point are included and all ranges within the indicated range to the tenth decimal place are included. Single forms (such as "emulsifier") include plural forms (such as "emulsifiers") and vice versa unless the context clearly dictates otherwise.

The dessert is water based or can be based on any other non-dairy liquid base such as fruit juice. The gelatin can be any bloom that is used for edible purposes. For example, the gelatin may be 250 or 275 bloom and all integers therebetween. The amount of gelatin should be such that a gel can form. Suitable amounts are from 1.5 to 3.5%.

The fat can be any edible fat. In one embodiment it is vegetable oil. For example, the fat can be palm kernel oil (PKO) and/or coconut oil. In another embodiment, the fat is hydrogenated PKO and partially hydrogenated coconut oil. In another embodiment, the fat can be soybean oil, canola oil, sunflower oil, corn oil, cottonseed oil, olive oil, peanut oil, rapeseed oil, safflower oil, or any fraction or combinations thereof. In another embodiment, the fat can be babassu oil, coconut oil, tucum oil, palm kernel oil, or any fraction or combination thereof. Suitable amounts of fat are from 5-10%.

The stabilizers in the present composition are hydrocolloids. These can be natural or synthetic. Examples include guar gum, locust bean gum, acacia gum, caregeenan, methyl cellulose, HPMC and the like. It is preferred that guar gum be not used alone because it was observed that in a composition containing guar gum (and very small amounts of locust bean and carageenan), the product did not form a gel with desirable properties and was not freezer stable. It is important to have at least acacia gum in the formulation and in one embodiment, the composition includes guar gum, locust bean gum, carageenan gum and acacia gum. The gums are generally from 0.5 to 1.0%. The majority of the gum component is acacia gum. For example, acacia gum can form 90-99.9% of the gum component.

Suitable emulsifiers for the present composition include polysorbate 60, polysorbate 80, mono and diglycerides, sorbitan and glyceride monostearate, lecithin and the like. Suitable amounts of emulsifiers are from 0.05 to 0.2%.

Suitable starch for the present composition includes corn starch, potato starch, tapioca starch and the like. In one embodiment, the starch is modified corn starch. Suitable amounts of starch are from 0.1 to 0.2%.

Various buffers may also be used in the present invention. Preferred buffering salts include disodium phosphate, dipotassium phosphate, disodium hexaphosphate, and sodium citrate. More than one buffer may be used in the present invention.

It is considered that fiber is an important ingredient of the present invention. Suitable amounts of fiber are 1.5% to 4.0%. An example is inulin—which is a soluble fiber. Another important fiber is wheat fiber. A convenient way of using two important components—wheat fiber and acacia gum—is to use Equacia, which is a gum-fiber containing ingredient and is commercially available. A suitable amount of Equacia is 0.5 to 1.5%. Equacia generally contains from 5-30% wheat fiber and 70-95% acacia gum. In one embodiment, the wheat fiber/acacia gum combination (Equacia) contains 10-12% gluten-free wheat fiber and the rest is acacia gum.

Various sugars can be used in the present composition. Suitable sugars for the present invention include, monosaccharides, disaccharides and polysaccharides. The sugars may be comprised of one or more sugars, such as sucrose, fructose, dextrose and/or intensive sweeteners, such as aspartame, acetosulfame, alitame, saccharin, cyclamates, and trichloro sucrose. In the event one or more intensive sweeteners are used, bulking agents may be included in the formulation to provide additional solids and provide body to the product structure. Suitable bulking agents include maltodextrin, polydextrose, polyglucose, xylitol, mannitol and sorbitol. Suitable amount of sugars is from 18-24%.

It is considered that the particular combination of ingredients as described herein provides a gelatin dessert which can be frozen in a ready-to-eat form and withstands one or more cycles of freezing and thawing. In the frozen form, the gelatin dessert can be stored in the freezer for at least 1 month. In various embodiments, it can be stored in the freezer for at least 2, 3, 4, 5, 6, 7, 8, 9, 10, 11, or 12 months. Thus, the gelatin does not need to be made fresh from powdered formulation by the end user, but rather can be purchased in a frozen ready to eat form. The frozen dessert can be simply thawed and consumed.

It is considered that the unique combination of ingredients provide freezer stability to this product. For comparison purposes, when other fibers or gums were tested, the product did not exhibit comparable freezer stability. Additionally, when guar gum was used alone, it did not result in the formation of a gelatin product that was comparable to the product produced by the present formulation.

| INGREDIENT | RESULTS AFTER STORAGE IN FREEZER FOR 1 WEEK AND THAW |
|---|---|
| Present invention without inulin or wheat fiber or acacia gum | Syneresis and crumbly Gel |
| ADDITIVES | PRIOR TO FREEZING |
| Inulin | Acceptable gel, undiserable syneresis |
| Profit ™ (vegetable micro fibers soluble and insoluble) | Crumbly and lumpy Gel |
| Metalose ™ SFE-50 (Hydroxypropyl methyl cellulose of high purity) | Dull and crumbly Gel not gelatin-like |
| Equacia ™ (gum acacia fibers and gluten-free insoluble wheat fibers) | Slightly crumbly; no syneresis |
| Mira-Thik ™ 469 (modified food starch) | Dull Gel not characteristic, very poor edibility |
| Seagel ™ FL 6625 (Carrageenan) | Crumbly Gel |
| Gelogen ™ RTE 20 (locust bean gum extract and carrageenan) | Crumbly Gel |
| Avicel ™ (Microcrystalline Cellulose) | No Gel formation |
| Inulin + Equacia | Typical gelatin type; Syneresis-free (Prior to freezing and after thaw) |

In the above table, Profit1M is commercially available from Panadino, Dannova Quimica, Metalose™ SFE-50 is available from R. W. Unwin & Co. Ltd ShinEtsu, MiraThik™ 469 is available from Tate & Lyle, Seagel™ FL 6625 and Avicel™ are available from FMC Biopolymer, and Gelogen™ RTE 20 is available from Cargill. The ingredients were tested at amounts between 0.9 to 2.5%. The table above indicates that the combination of inulin, wheat fiber and acacia gum was needed for freezer stability characteristics. The gelatin dessert products of the present invention have a moist-cool mouth feel. Even though the product contains no milk, it has a mouth-feel, texture and organoleptic feel like that of a milk product.

For preparing the gel, the various ingredients can be mixed as known in the art. The gel is formed by heating the jelly mixture to 65-75° C. and then cooling to 40° C. until depositing it in nonstick pans and cooling it to 4-7° C. A convenient way is to use a premix of some of the ingredients.

For example, a premix of fat, buttermilk solids, starch, emulsifiers, and gums can be made as follows. The starch, guar gum, emulsifiers, buffering agent, butter milk powder can be mixed in water and then fat is added and thoroughly mixed. The resultant mixture can be heated (such as to 66° C.). The mixture can be subjected to UHT treatment using steam injection or tube heat exchanger and then homogenized. The resultant mixture can be cooled and then stored for later use. To make the gelatine dessert, the gelatin is dissolved in water and then mixed with the premix and other components including sugar, inulin, wheat fiber and acacia gum. The mixture can be refrigerated and gels in about 1 hour. It can be kept in the refrigerator overnight and then frozen for long storage. For use, the frozen gel can be thawed overnight in the refrigerator and then used for consumption. After thawing, the dessert is stable in the refrigerator for at least 7 days.

In order to make a more appetizing dessert the product is formed in several layers of different flavors and sometimes includes, canned or dry fruits and alternated milk and water-based layers of jelly. The product can tolerate acidity and therefore, if desired, yogurt can be added to the product prior to gel formation.

The product can be made in a single serving size or larger family size (such as 20 1-2.5 kg) and can have multiple layers (such as 3-6 layers). Further, dry fruit can be included in one or more layers, such as in the bottom layer.

Some of the characteristics of the present product include: The prepared gel dessert product can be stored at freezer temperatures instead of refrigeration. The shelf life in the freezer is at on the order of months instead of days. In one embodiment, the product can be stored in the freezer for at least 6 months. In another embodiment, it can be stored in the freezer for at least 12 months. Because the prepared product can be frozen and stored at the freezer temperatures for an extended period of time, the product can be distributed in a ready to eat state. Additionally, the dessert product is a gelatin dessert product, which maintains its integrity even after freezing and thawing, with the traditional mouth feel of a gelatin gel easily melting in the mouth.

TABLE 2

| INGREDIENT | RANGE (wt %) | ONE EMBODIMENT (wt %) |
|---|---|---|
| Non-dairy fat | 5-10 | 7.2 |
| Buttermilk solids | 1-2 | 1.2 |
| Sugar | 18-24 | 21.15 |
| Starch | 0.1-0.2 | 0.12 |
| Emulsifiers | 0.05-0.2 | 0.1 |
| Gums | 0.001 to 0.002 | 0.0014 |
| Inulin | 1.5-3.5 | 2.5 |
| Combined wheat fiber and acacia gum | 0.5-1.5 | 0.9 |
| Gelatine | 1.5-3.5 | 2.65 |
| Flavor/color/buffer | 0.1-0.2 | 0.07 |
| Water | 60-70 (to make to 100) | 64 (to make to 100) |

Table 2 provides the composition of the water based formulation. The buttermilk solids-contain minerals, proteins and sugar from milk. This ingredient is generally a sub product in the production of butter. Some of the components (part water, fat, dairy solids, part sugar, starch, part color/salts, emulsifiers and gums) can be added in the form of a premix. For example, the composition of nondairy cooking cream found in U.S. Pat. No. 7,658,962, the disclosure of which is incorporated herein by reference can be used.

EXAMPLE 1

In this example, the premix provided below in Table 3 was used.

TABLE 3

(Pre-Mix I)

| INGREDIENTS | One Embodiment Wt % |
|---|---|
| Water | 63 |
| Palm kernel oil | 20 |
| Coconut oil | 10 |
| Buttermilk Solids | 5 |
| Sugar | 0.6 |
| Modified Corn Starch | 0.5 |
| Disodium Phosphate | 0.2 |
| Mono and Diglycerides | 0.2 |
| Polysorbate 60 | 0.2 |
| Guar gum | 0.15 |
| Locust gum | 0.08 |
| Carageenan | 0.0098 |
| Soy Lecithin | 0.06 |
| Beta Carotene color | 0.0002 |
| TOTAL | 100 |

The premix was then used to prepare the gelatin dessert using the following formulation (Table 4).

TABLE 4

| INGREDIENT | One Embodiment WT % | Range Wt % |
|---|---|---|
| Water | 48.8 | 46-50 |
| Premix | 24.04 | 20-25 |
| Sugar | 21.01 | 18-22 |
| Gelatine | 2.65 | 1.5-3.5 |
| Inuline | 2.52 | 1.5-3.5 |
| Equacia | 0.90 | 0.5-1.5 |
| Flavor/color | 0.07 | 1.0-0.2 |
| Total | 100.0 | 100.0 |

The product had a very desirable mouth feel and texture and was freezer stable for at least 13 months. The product has a characteristic product with particular visual and sensorial properties that make it desirable. The gel responsible of this product, gives it a nice smooth soft and firm non rough texture. Further, it has a shining and transparent appearance.

While this invention has been described through specific embodiment, routine modifications will be apparent to those skilled in the art and such modifications are intended to be within the scope of the invention.

We claim:

1. A gelatin dessert product that is freezer stable comprising gelatin, fiber, gum, emulsifier, fat, starch, 58.6-70 wt. % non-dairy liquid and sugar which combined weight of such ingredients represents at least 87.651 wt. % of said gelatin dessert product, said gelatin based on a non-dairy liquid, said gelatin having a bloom of 250-275, wherein the gum comprises at least acacia gum and the fiber comprises at least inulin and wheat fiber, a weight percent of said inulin fiber is greater than a weight percent of said wheat fiber, said fiber constitutes 1.5 to 4.0 wt. % of said gelatin dessert product, said starch constituting at least 0.1 wt. % of said gelatin dessert product, wherein said gelatin dessert product can withstand freezing and thawing, and can be stored in the freezer for at least two months and upon thawing is a ready-to-use gelatin dessert with a soft and smooth texture and is stable in a gelled form for at least seven days after being thawed in refrigerated temperatures.

2. The gelatin dessert product of claim 1, wherein the fat is from 5 to 10 wt. %.

3. The gelatin dessert of claim 2, wherein the fat comprises palm kernel and coconut oil.

4. The gelatin dessert product of claim 1, wherein gelatin is from 1.5 to 3.5 wt. %.

5. The gelatin dessert product of claim 1, wherein the inulin is from 1.5 to 3.5 wt. % and wheat fiber is from 0.01 to 0.5 wt. % of said gelatin dessert product.

6. The gelatin dessert product of claim 1, wherein the gum is from 0.05 to 0.5 wt. %.

7. The gelatin dessert product of claim 1, wherein the emulsifier is from 0.05 to 0.2 wt. %.

8. The gelatin dessert product of claim 1, wherein the sugar is from 18-24 wt. %.

9. The gelatin dessert product of claim 1, wherein the fat is from 5 to 10%, gelatin is from 1.5 to 3.5 wt. %, fiber is from 1.5 to 4.0 wt. %, gum is from 0.05 to 0.5 wt. %, emulsifier is from 0.05 to 0.2 wt. %, and sugar is from 18-24 wt. %.

10. The gelatin dessert product of claim 1, which can be stored in the freezer for at least 2 months.

11. The gelatin dessert product of claim 10, which can be stored in the freezer for at least 12 months.

12. A gelatin dessert product comprising gelatin, fat, sugar, emulsifier, fiber, starch, 58.6-70 wt. % non-dairy liquid and stabilizer which combined weight of such ingredients represents at least 87.651 wt. % of said gelatin dessert product, wherein said stabilizer includes at least acacia gum, said fiber constitutes 1.5 to 4.0 wt. % of said gelatin dessert product, said starch constituting at least 0.1 wt. % of said gelatin dessert product, wherein said fiber includes inulin and wheat fiber, said gelatin dessert product can withstand freezing and thawing and can be stored in the freezer for at least two months and upon thawing is a ready-to-use gelatin dessert with a soft and smooth texture.

13. The gelatin dessert product as defined in claim 12, wherein said stabilizer includes a plurality of gums selected from the group consisting of guar gum, locust bean gum, acacia gum, carrageenan, methyl cellulose, and HPMC.

14. The gelatin dessert product as defined in claim 13, wherein a majority of said gum includes acacia gum.

15. The gelatin dessert product as defined in claim 13, wherein a content of said inulin is about 1.5 wt. % to 3.5 wt. % and a content of said wheat fiber is about 0.01 wt. % to 0.5 wt. % of said gelatin dessert product.

16. The gelatin dessert product as defined in claim 12, wherein said fat includes one or more edible fats selected from the group consisting of vegetable oil, palm kernel oil, coconut oil, hydrogenated palm kernel oil, partially hydrogenated coconut oil, soybean oil, canola oil, sunflower oil, corn oil, cottonseed oil, olive oil, peanut oil, rapeseed oil, safflower oil, babassu oil, and tucum oil.

17. The gelatin dessert product as defined in claim 16, wherein said fat includes palm kernel and coconut oil.

18. The gelatin dessert product as defined in claim 12, wherein said fat content is about 5 wt % to 10 wt %.

19. The gelatin dessert product as defined in claim 12, wherein said gelatin content is about 1.5 wt % to 3.5 wt %.

20. The gelatin dessert product as defined in claim 12, wherein said stabilizer includes gum, said gum is about 0.05 wt % to 1 wt %.

21. The gelatin dessert product as defined claim 12, wherein said emulsifier content is about 0.05 wt % to 0.2 wt %.

22. The gelatin dessert product as defined in claim 12, wherein said sugar content is about 18 wt % to 24 wt %.

23. A method for forming a gelatin dessert product that includes the steps of:
   a. mixing together gelatin having a bloom of 250-275, fat, sugar, emulsifier, 1.5-4 wt. % fiber, at least 0.1 wt. % starch, 58.6-70 wt. % non-dairy liquid and 0.05-1 wt. % stabilizer to form a mixture and which combined weight of such ingredients represents at least 87.651 wt. % of said mixture, said stabilizer includes at least acacia, said fiber includes soluble fiber and wheat fiber, said soluble fiber including inulin;
   b. heating said mixture during and/or after the mixing step to a temperature of about 65° C. to 75° C.; and,
   c. cooling said mixture until said mixture gels;
   d. freezing said mixture after said mixture has gelled, said frozen mixture stable for at least one month in a frozen state and stable in a gelled form for at least seven days after being thawed in refrigerated temperatures.

24. The method as defined in claim 23, wherein said mixture is UHT treated prior to freezing said mixture.

25. The method as defined in claim 23, wherein said mixture comprising by weight percent:

| | |
|---|---|
| gelatin | 1.5-3.5% |
| sweetener | 18-24% |
| fat | 5-10% |
| emulsifier | 0.05-0.2% |
| starch | 0.1-0.2% |
| non-dairy liquid | 58.6-70% |
| stabilizer | 0.05-1% |
| soluble fiber | 1.5-3.5% |
| wheat fiber | 0.01-0.5%. |

26. The method as defined in claim 24, wherein said mixture comprising by weight percent:

| | |
|---|---|
| gelatin | 1.5-3.5% |
| sweetener | 18-24% |
| fat | 5-10% |
| emulsifier | 0.05-0.2% |
| starch | 0.1-0.2% |
| non-dairy liquid | 58.6-70% |
| stabilizer | 0.05-1% |
| soluble fiber | 1.5-3.5% |
| wheat fiber | 0.01-0.5%. |

27. A gelatin dessert that is freezer stable for at least one month and smooth and creamy after thawing, said gelatin dessert comprising gelatin having a bloom of 250-275, sweetener, fat, emulsifier, at least 0.1 wt. % starch, 58.6-70 wt. % non-dairy liquid, 0.05-1 wt. % stabilizer, and 1.5-4 wt. % fiber which combined weight of such ingredients represents at least 87.651 wt. % of said gelatin dessert, said fiber including a plurality of fibers selected from the group consisting of soluble fiber and wheat fiber, said soluble fiber consisting of inulin, said stabilizer including hydrocolloids, said hydrocolloids including acacia gum.

28. The gelatin dessert as defined in claim 27, wherein said weight percent of soluble fiber is greater than said weight percent of said wheat fiber.

29. The gelatin dessert as defined in claim 27, wherein said fat includes one or more fats selected from the group consisting of palm kernel oil and coconut oil.

30. The gelatin dessert as defined in claim 28, wherein said fat includes one or more fats selected from the group consisting of palm kernel oil and coconut oil.

31. The gelatin dessert as defined in claim 27, wherein over 50 wt. % of said hydrocolloids includes acacia gum.

32. The gelatin dessert as defined in claim 30, wherein over 50 wt. % of said hydrocolloids includes acacia gum.

33. The gelatin dessert as defined in claim 27, comprising by weight percent:

| | |
|---|---|
| gelatin | 1.5-3.5% |
| sweetener | 18-24% |
| fat | 5-10% |
| emulsifier | 0.05-0.2% |
| starch | 0.1-0.2% |
| non-dairy liquid | 58.6-70% |
| stabilizer | 0.05-1% |
| soluble fiber | 1.5-3.5% |
| wheat fiber | 0.01-0.5%. |

34. The gelatin dessert as defined in claim 32, comprising by weight percent:

| | |
|---|---|
| gelatin | 1.5-3.5% |
| sweetener | 18-24% |
| fat | 5-10% |
| emulsifier | 0.05-0.2% |
| starch | 0.1-0.2% |
| non-dairy liquid | 58.6-70% |
| stabilizer | 0.05-1% |
| soluble fiber | 1.5-3.5% |
| wheat fiber | 0.01-0.5%. |

35. The gelatin dessert as defined in claim 27, wherein said hydrocolloids further include one or more compounds selected from the group consisting of guar gum, locust bean gum, carrageenan, methyl cellulose, and HPMC.

36. The gelatin dessert as defined in claim 34, wherein said hydrocolloids further include one or more compounds selected from the group consisting of guar gum, locust bean gum, carrageenan, methyl cellulose, and HPMC.

37. The method as defined in claim 23, wherein said weight percent of soluble fiber is greater than said weight percent of said wheat fiber.

38. The method as defined in claim 26, wherein said weight percent of soluble fiber is greater than said weight percent of said wheat fiber.

39. The method as defined in claim 23, wherein said fat includes one or more fats selected from the group consisting of palm kernel oil and coconut oil.

40. The method as defined in claim 38, wherein said fat includes one or more fats selected from the group consisting of palm kernel oil and coconut oil.

41. The method as defined in claim 23, wherein over 50 wt. % of said stabilizer includes acacia gum.

42. The method as defined in claim 40, wherein over 50 wt. % of said stabilizer includes acacia gum.

43. The method as defined in claim 23, wherein said stabilizer further include one or more compounds selected from the group consisting of guar gum, locust bean gum, carrageenan, methyl cellulose, and HPMC.

44. The method as defined in claim 42, wherein said stabilizer further include one or more compounds selected from the group consisting of guar gum, locust bean gum, carrageenan, methyl cellulose, and HPMC.

* * * * *